United States Patent
Terzis et al.

(10) Patent No.: US 8,042,123 B2
(45) Date of Patent: Oct. 18, 2011

(54) OPTICAL DISC HANDLING FOR STANDARD SLIM DRIVE

(75) Inventors: Price Berrien Terzis, Los Altos Hills, CA (US); Artem Mishin, Daly City, CA (US)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 350 days.

(21) Appl. No.: 12/463,264

(22) Filed: May 8, 2009

(65) Prior Publication Data

US 2009/0282425 A1 Nov. 12, 2009

Related U.S. Application Data

(60) Provisional application No. 61/051,770, filed on May 9, 2008.

(51) Int. Cl.
*G11B 17/04* (2006.01)

(52) U.S. Cl. ........................................... 720/601

(58) Field of Classification Search .................. 720/624, 720/601, 607, 608, 613, 614, 615, 622, 632, 720/633; 369/30.62, 30.56, 30.86, 30.71
See application file for complete search history.

(56) References Cited

U.S. PATENT DOCUMENTS

| | | | | |
|---|---|---|---|---|
| 4,984,228 | A * | 1/1991 | Agostini | 369/30.86 |
| 7,254,818 | B2 * | 8/2007 | Hagstrom | 720/601 |
| 2007/0291597 | A1 * | 12/2007 | Lee et al. | 369/30.62 |
| 2009/0168237 | A1 * | 7/2009 | Hsiao et al. | 360/110 |

* cited by examiner

*Primary Examiner* — Allen Cao
(74) *Attorney, Agent, or Firm* — Birch, Stewart, Kolasch & Birch, LLP

(57) ABSTRACT

A media library appliance comprises optical disc handling robotics developed for dual standard slim drives in a vertical orientation. The disc handling robotics comprise a disc transfer assembly for transferring discs to and from a rotatable circular carousel surrounding the optical drives. Each slim drive resides in a separate field-replaceable unit ("FRU") that can be replaced by a customer in the field without powering down the appliance. The FRU includes various features that allow accurate 3-axis alignment and registration of the optical drive within the appliance.

18 Claims, 12 Drawing Sheets

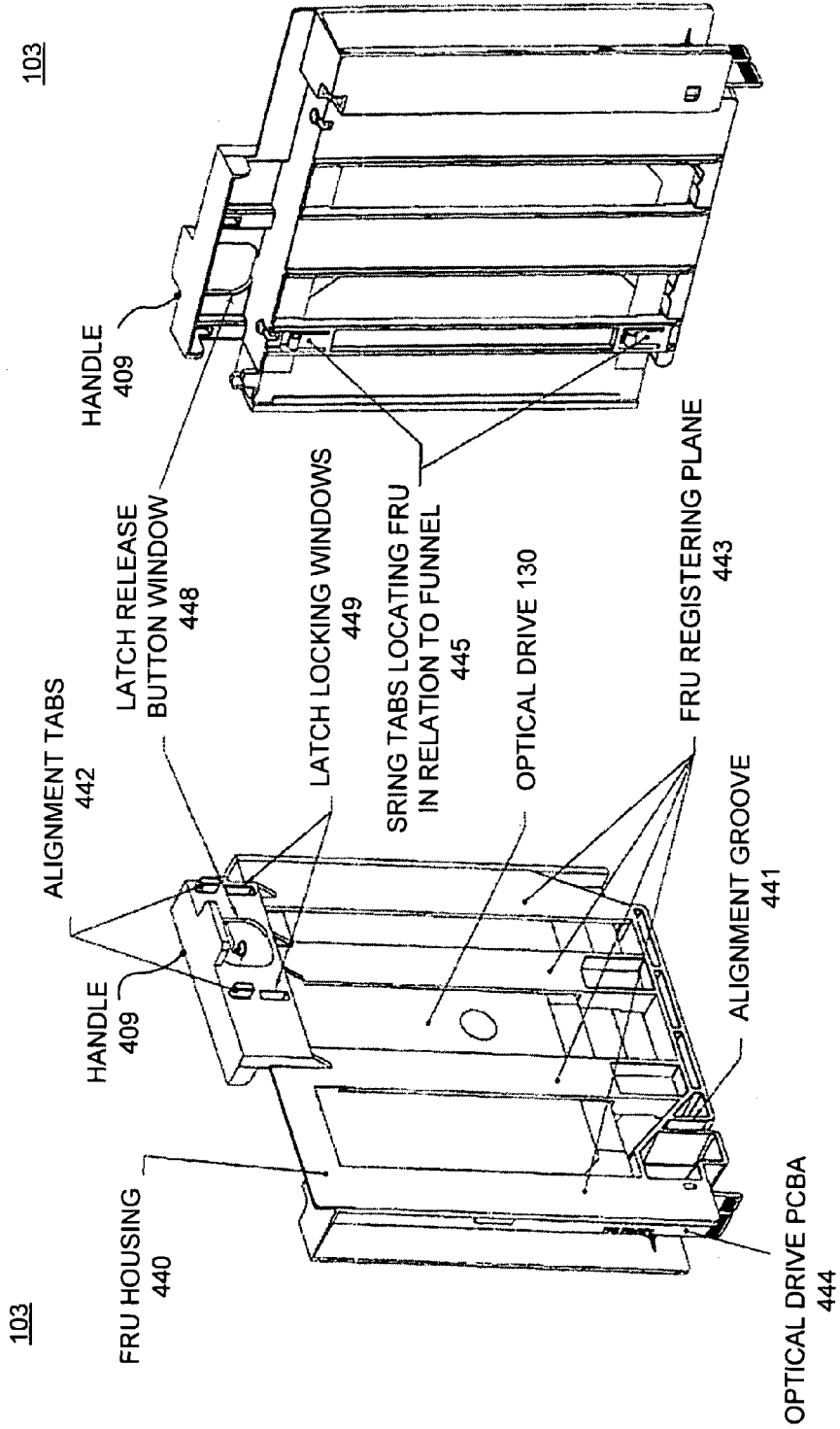

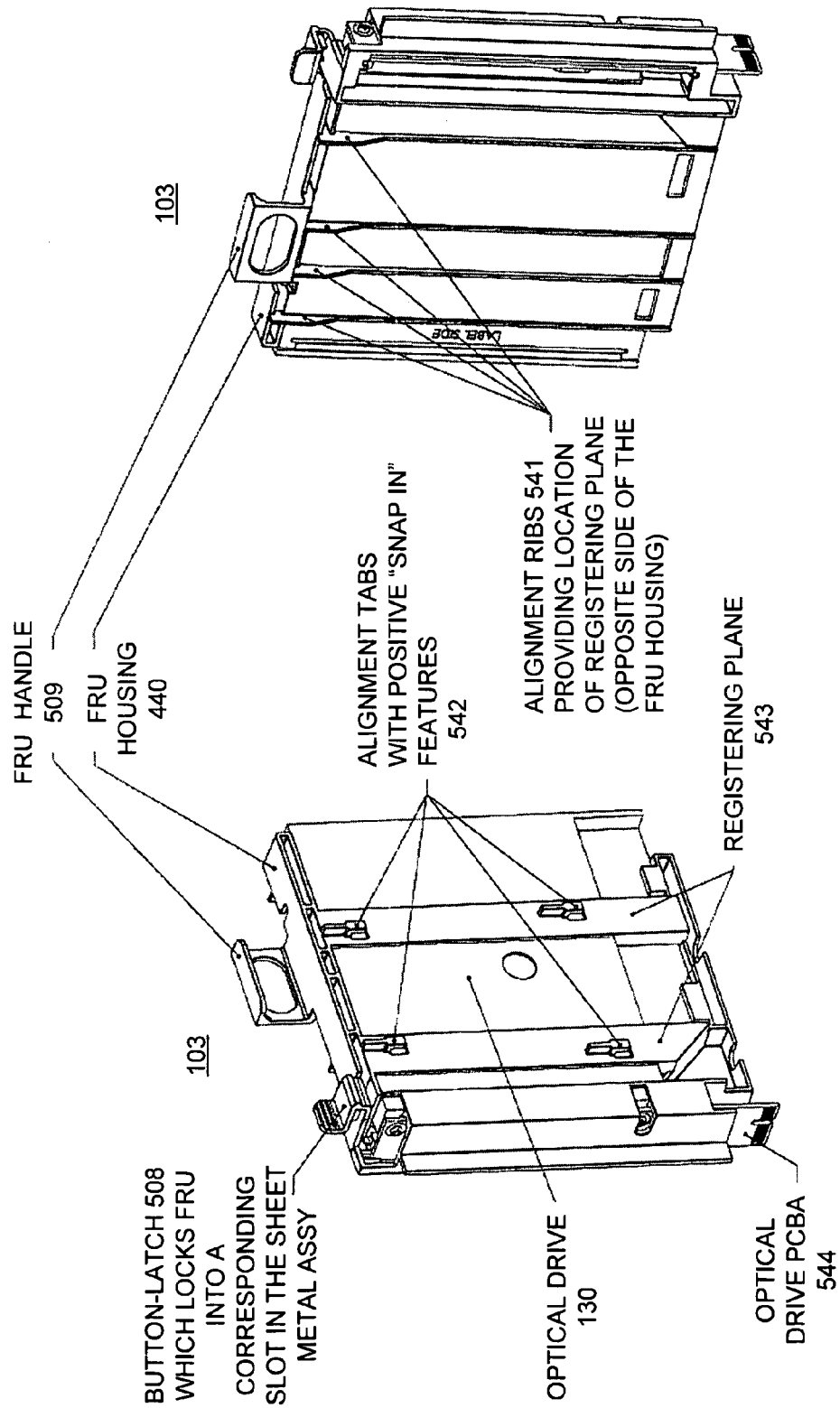

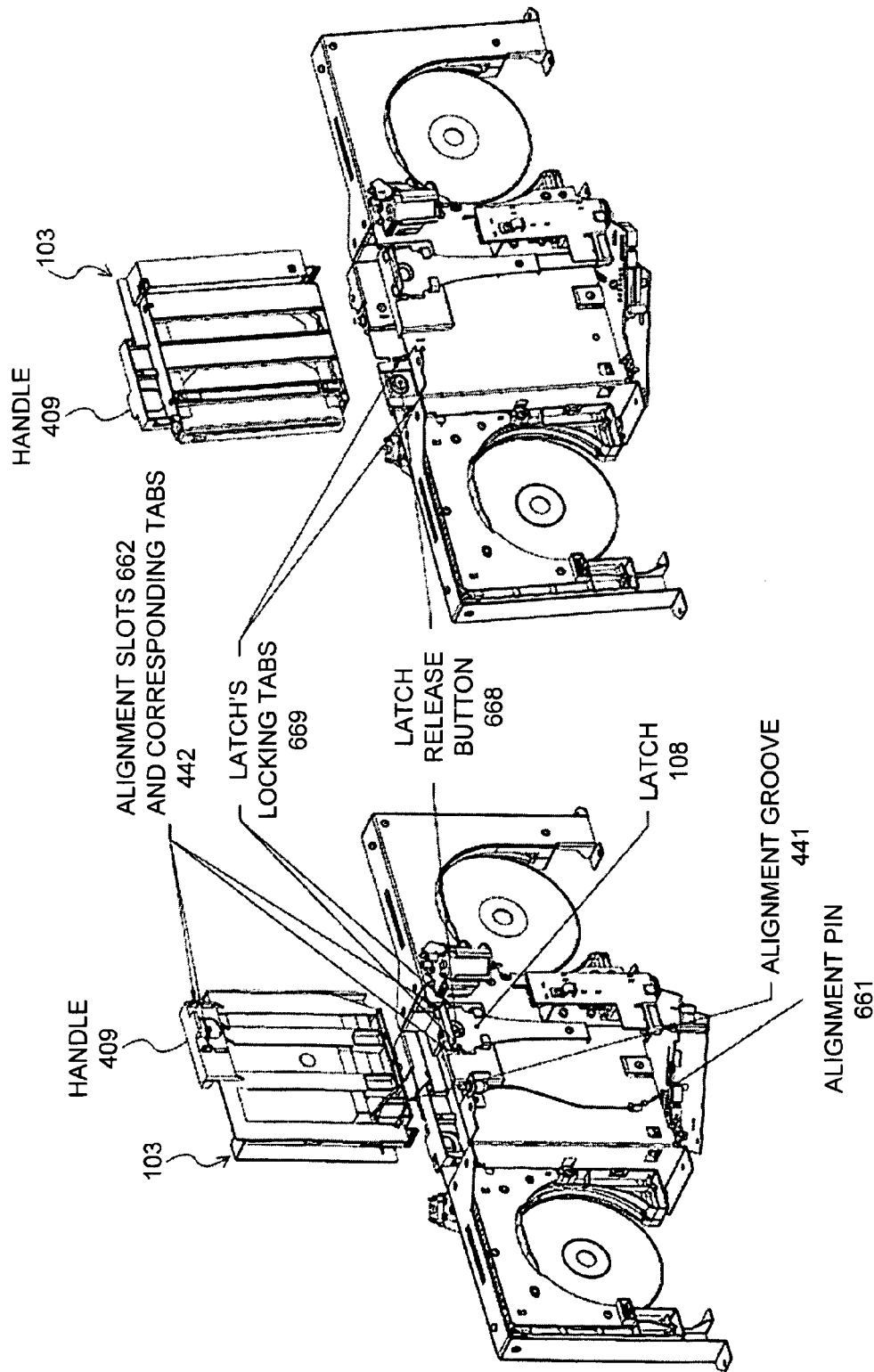

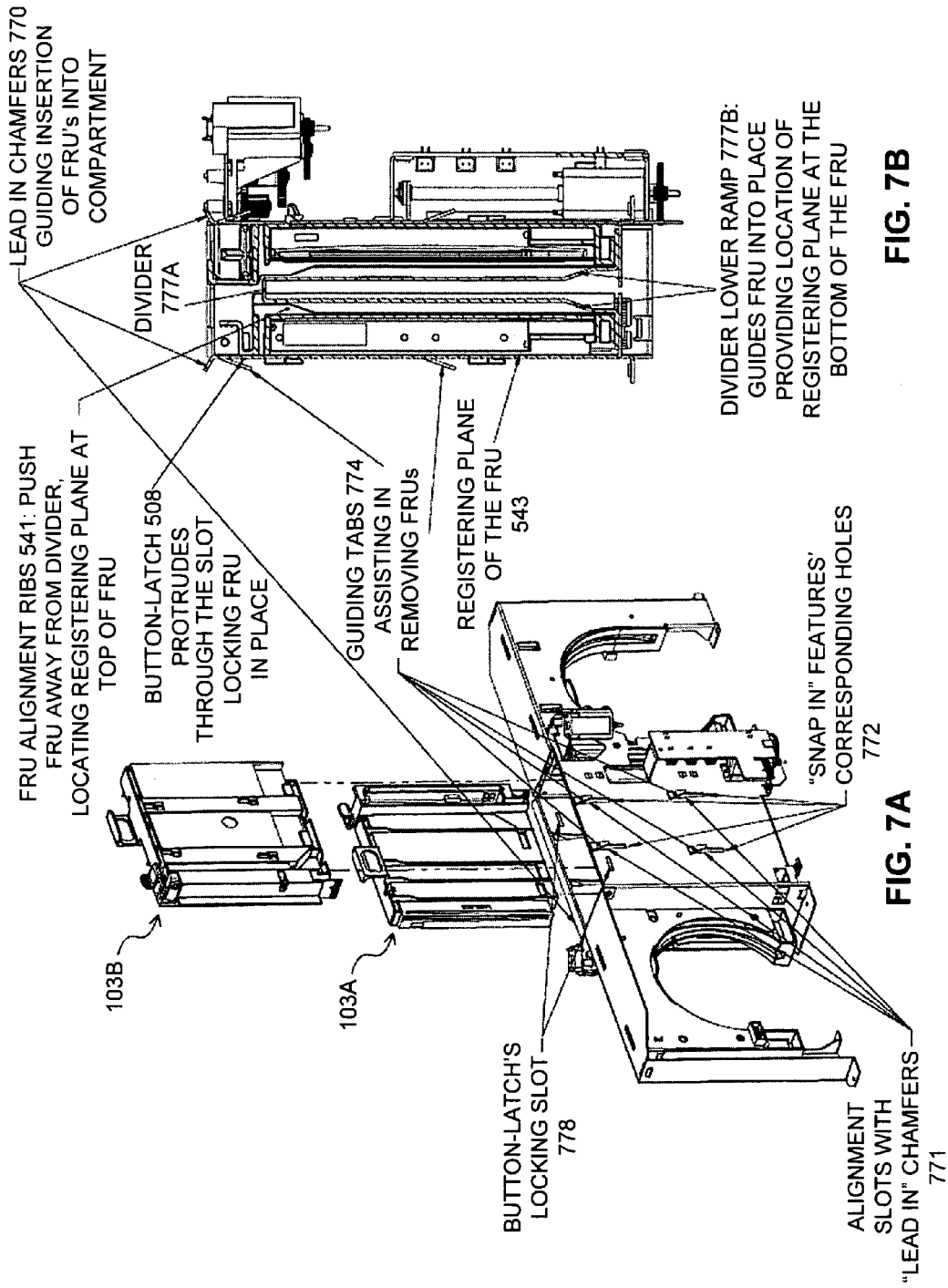

US 8,042,123 B2

OPTICAL DISC HANDLING FOR STANDARD SLIM DRIVE

CROSS-REFERENCE TO RELATED APPLICATIONS

This application claims the benefit of U.S. Provisional Application 61/051,770, filed on May 9, 2008, and incorporated by reference herein in its entirety.

BACKGROUND OF THE INVENTION

1. Field of the Invention

This invention pertains in general to handling optical discs and replacement of disc drives used in data storage systems.

2. Description of the Related Art

Various designs of optical disc libraries are known. For example, U.S. Pat. No. 4,984,228 to Agostini entitled "Dual Drive Changer for Records," issued Jan. 8, 1991, describes a system wherein an annular-shaped magazine for the storage of discs surrounds two disc drives. The magazine rotates relative to the disc drives, which allows dual mechanisms to load/unload the discs to/from the drives from/to the magazine.

SUMMARY

Embodiments of the invention provide methods and systems for handling optical discs in a media library appliance and for replacing optical drives in the field. In one embodiment, the media library appliance comprises optical disc handling robotics developed for dual standard slim drives in a vertical orientation. Each slim drive resides in a separate field-replaceable unit ("FRU").

In one embodiment, the disc handling robotics comprise a disc transfer assembly for transferring discs to and from a rotatable circular carousel surrounding the optical drives. The carousel rotates around the optical drives until the appropriate disc is aligned with an optical drive. A pusher arm pushes the outer trailing edge of a disc to roll or slide the disc into the optical drive. A knife may move into an active position to push the disc further into the optical drive and prevent any undesired untimely unloading of the disc from the drive or attempted loading of another disc when the drive is occupied. Upon unloading, the knife may also assist with pushing an ejected disc away from the drive and into the carousel.

In another embodiment, each FRU houses a standard optical slim drive that can be replaced by a customer in the field without powering down the appliance. The FRU includes various features that allow accurate 3-axis alignment and registration of the optical drive within the appliance. In some embodiments, the FRU includes a latch that locks the FRU into the appliance. By depressing the latch release button through the FRU handle, the FRU can be easily lifted out of the appliance for replacement by the handle using one or more fingers. An optional feature of the disc transfer assembly blocks access to the latch release button for a functional FRU, thus preventing replacement of the wrong FRU.

The present invention has various embodiments, including as a computer implemented process and as computer apparatuses. The features and advantages described herein are not all-inclusive. Many additional features and advantages will be apparent to one of ordinary skill in the art in view of the drawings and detailed description.

BRIEF DESCRIPTION OF THE DRAWINGS

FIGS. 4A-B are views of an example of a field-replaceable unit ("FRU"), in accordance with one embodiment.

FIGS. 5A-B are views of another example of a FRU, in accordance with one embodiment.

FIGS. 6A-B are views of an example of a FRU positioned for insertion in the media library appliance, in accordance with one embodiment.

FIG. 7A illustrates the alignment of two FRUs positioned for insertion in the data storage appliance, in accordance with one embodiment.

FIG. 7B illustrates the FRUs in operational positions within the media library appliance, in accordance with one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

1. Overview of the Media Library Appliance

Figure 1:
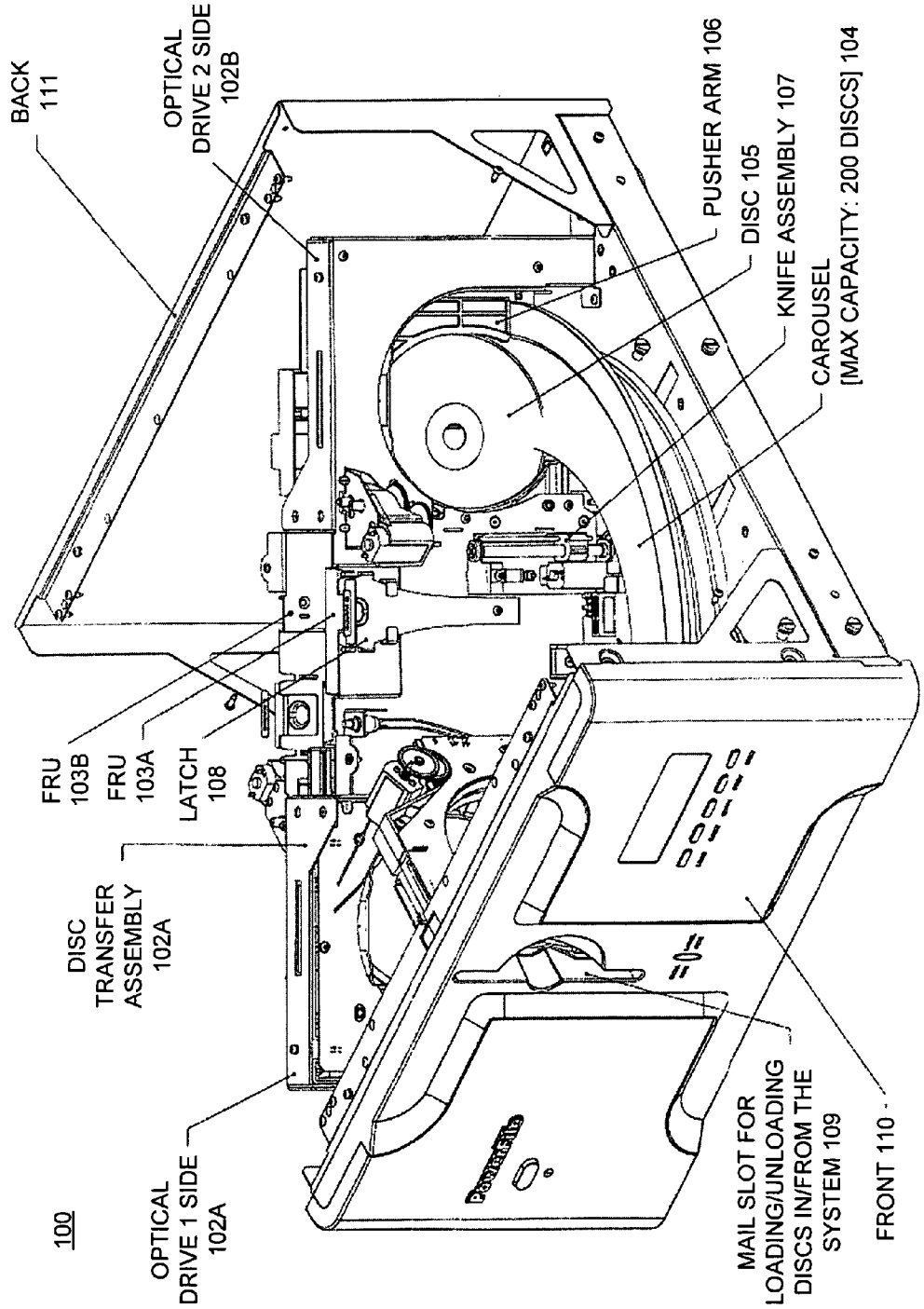
FIG. 1 illustrates the optical disc handling system of a media library appliance, in accordance with one embodiment.

Embodiments of the invention include a media library appliance used to read and/or write data stored on a plurality of optical discs within the library. FIG. 1 illustrates the optical disc handling system of a media library appliance 100, in accordance with one embodiment. Whereas the front 110 and back 111 sides of the appliance 100 are illustrated, the left side, right side, and top portions of the housing of the appliance 100 are removed in FIG. 1 so that the arrangement of the interior components of the appliance 110 can be viewed. In one embodiment, the appliance 100 is a modular rack appliance having a size of five rack mount units ("RMU"), although other form factors can also be used.

In the example illustrated in FIG. 1, the interior components of the appliance 100 include two 12.7 mm or 9.5 mm slim drives housed in separate field-replaceable unit ("FRU") modules 103A, 103B. Each FRU drive can be made compatible according to the Parallel Advanced Technology Attachment/Serial Advanced Technology Attachment ("SATA/PATA") requirements for interfacing with the appliance 100. The FRU modules 103A, 103B are modules to enable the drive housed therein to be swapped out of the appliance 100 by a customer in the field without the need to power down the appliance to execute the exchange. Features of the FRU modules 103A, 103B that enable them to be easily replaceable in the field will be described in greater detail with respect to FIGS. 4A-8.

Referring back to FIG. 1, the FRU modules 103A, 103B house optical drives that are oriented vertically in the center of a circular disc carousel 104, also referred to herein as a bowl 104. The carousel 104 holds, for example, 200 discs in individual slots, and rotates around the FRU modules 103A, 103B. The carousel is one means for storing a plurality of optical discs that rotates around the FRU modules 103A, 103B. A slot 109 in the front 110 of the appliance 100 provides a means to load/unload discs 105 to/from the carousel.

The interior components of the appliance 100 also include a disc transfer assembly 101. Each drive within the FRU modules 103A, 103B has a respective side 102A, 102B of a disc transfer assembly 101 positioned to transfer individual optical discs 105 from the carousel 104 to the respective drive in the FRU 103A, 103B during the disc loading operation, and from the respective drive in the FRU 103A, 103B to the carousel 104 in the disc unloading operation.

Also illustrated among the interior components of the appliance 100 in FIG. 1 are a pusher arm 106 and a knife assembly 107 that will be described in greater detail with respect to FIGS. 2A-C and 3A-C in Section 2 below. FIG. 1 also illustrates a latch 108, that will be described in greater detail with respect to FIGS. 4A-B and 6A-B in Section 3 below.

2. Disc Handling

Figure 2A:
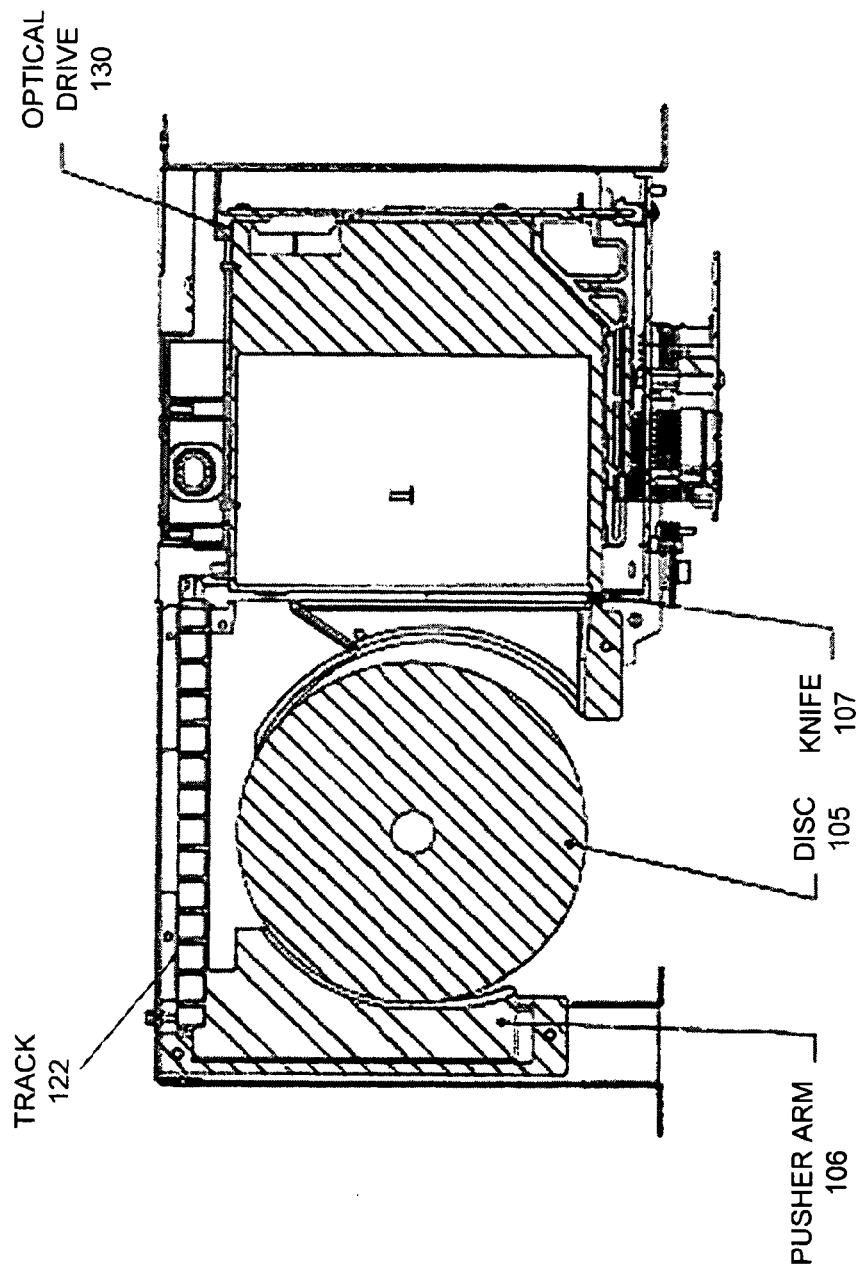
FIGS. 2A-C illustrate loading a disc into an optical drive of a media library appliance, in accordance with one embodiment.
Figure 2B:
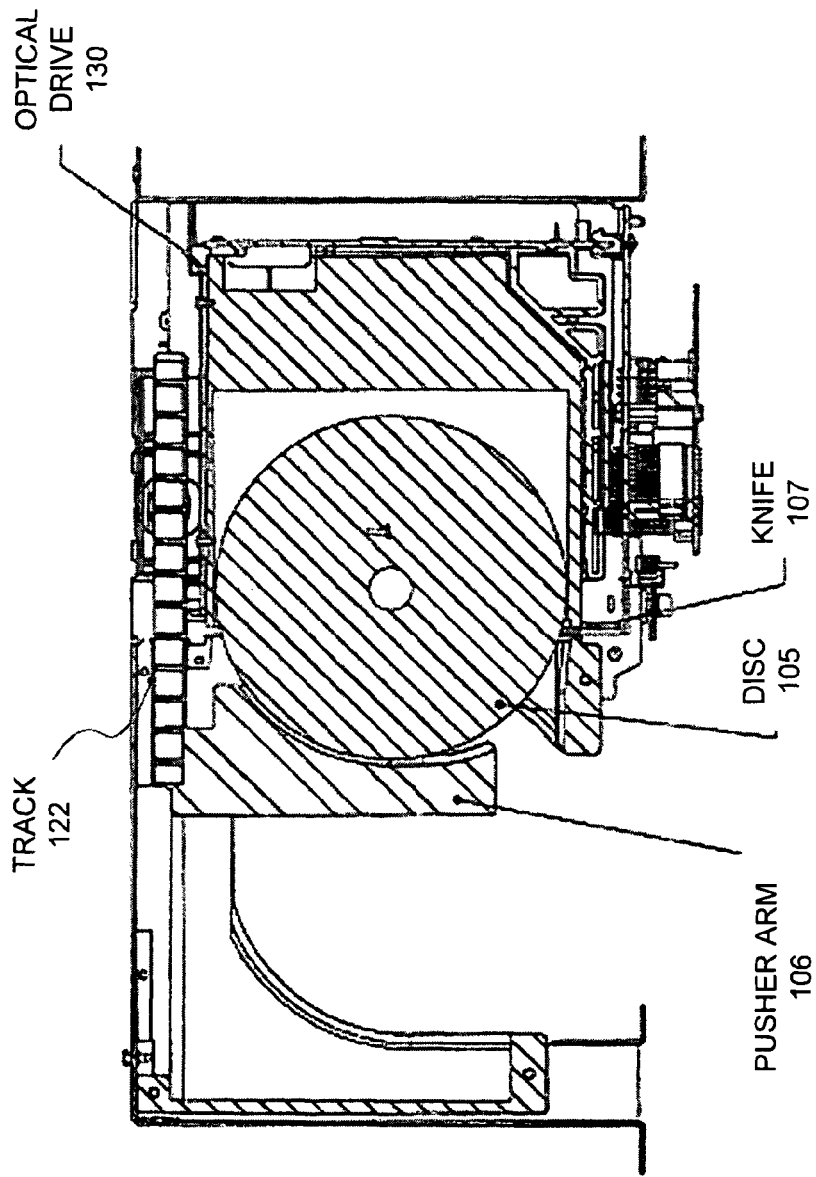
Figure 2C:
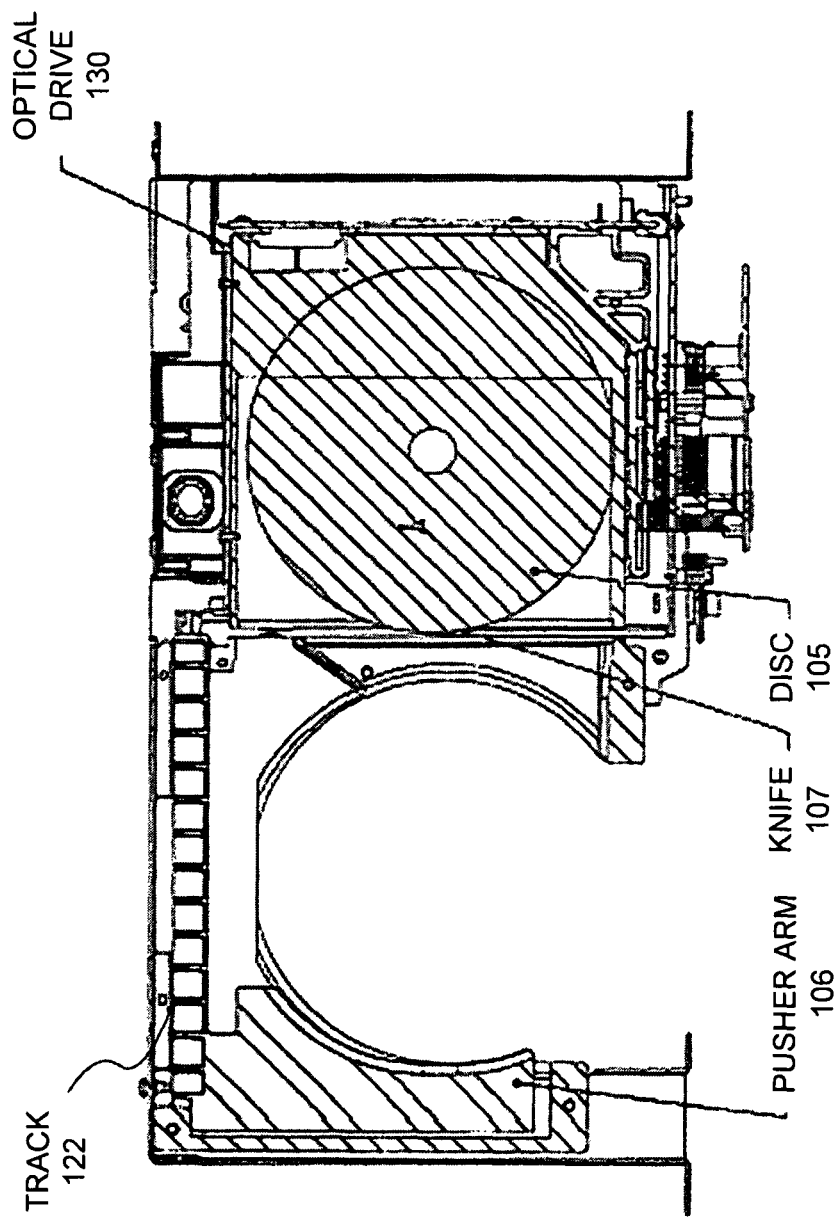

FIGS. 2A-C illustrate the disc handling operation of loading a disc 105 into an optical drive 130 of the appliance 100, in accordance with one embodiment. The carousel 104 rotates around the optical drives in FRUs 103A, 103B until the appropriate disc is aligned with the appropriate side 102A, 102B of the disc transfer assembly 101. FIG. 2A shows the initial position of the pusher arm 106, the disc 105, and the knife 107 relative to the optical drive 130. In the example shown, the pusher arm 106 operates by sliding back and forth on a track 122 above the arm 106. In other embodiments, the pusher arm 106 may be articulated in various ways. For example, the pusher arm 106 may have cam action for sliding the disc 105 into the drive. In one embodiment, the pusher arm has a curved contact surface corresponding to the curve of the outer edge of an optical disc 105. The pusher arm is one means for pushing a disc at least partially into a drive. Referring to FIG. 2A, the pusher arm 106 is at rest in the position furthest from the optical drive 130. The disc 105 is resting in the bowl 104, and the knife 107 is in the lower position in preparation for the transfer of the disc 105 from the bowl 104 to the optical drive 130. The knife 107 is a tool that, when extended or inserted at least partially in front of the opening in the optical drive 130, assists a partially loaded disc 105 in completing the loading process and/or prevents unintended disc 105 ejections or loads. The knife may be mounted, for example, above or below the opening in the optical drive to perform these functions.

FIG. 2B illustrates the position of the pusher arm 106, the disc 105, and the knife 107 in the middle of the loading operation. In this example, the pusher arm 106 moves laterally along the track 122 with enough force to roll or slide the disc 105 from the bowl 104 partially into the optical drive 130. In one embodiment, the components of the disc transfer assembly 101, including the pusher arm 106, only contact the trailing edge of the disc 105 to avoid damage to the data stored on the disc 105. During the loading procedure, the knife 107 remains in the lower position, and does not block the access of the disc 105 to the optical drive 130.

FIG. 2C illustrates the position of the pusher arm 106, the disc 105 and the knife 107 at the conclusion of the loading operation. The pusher arm 106 retracts along the track 122 to the position furthest from the optical drive 130. The knife 107 moves from an inactive position to an active position, in this case, a raised position. The knife 107 can be moved from an inactive position to an active position by any mechanism known to those of skill in the mechanical arts, such as a screw.

The active position of the knife 107 has two main benefits. First, the raising of the knife 107 causes the leading edge of the knife 107 to exert a lateral force on the curved outside edge of the disc 105 to push the disc 105 further into the optical drive 130 if needed to activate the internal mechanism of the optical drive 130 that draws in a disc 105. The knife 107 makes contact, if any, with an outside edge of the disc 105 to prevent any damage to the data-carrying portions of the disc 105. Second, in the active position, the knife 107 acts as a lock that prevents an undesired unloading of the disc 105 from the drive 130 when the bowl 104 is not in the correct position to receive the disc 105. The knife 107 in the active position also blocks an attempted loading of a second disc 105 into the same drive 130 when the drive 130 is already occupied by a disc 105. In one embodiment, the knife 107 is a tool having a relatively long flat blade that is used to nudge a disc 105 further into the optical drive 130 if needed and perform the blocking function to prevent undesired unloading or attempting loading of a second disc, as described above. The knife need not have a sharp or cutting edge. The knife is one means for exerting the lateral force to push the disc further into the optical drive and partially block the opening to the optical drive 130, but other mechanisms are also possible.

Figure 3A:
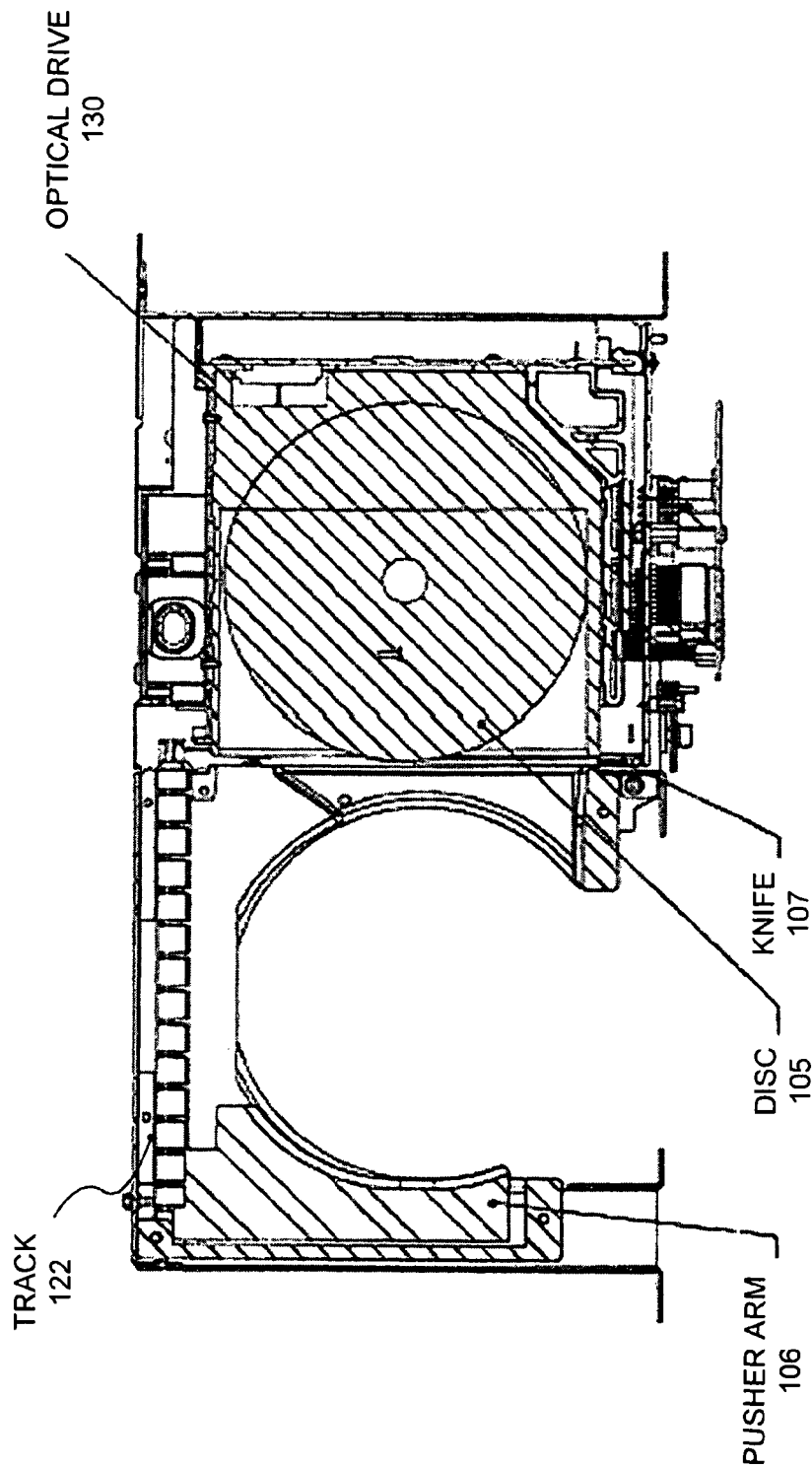
FIGS. 3A-C illustrate unloading a disc from an optical drive of a data storage appliance, in accordance with one embodiment.
Figure 3B:
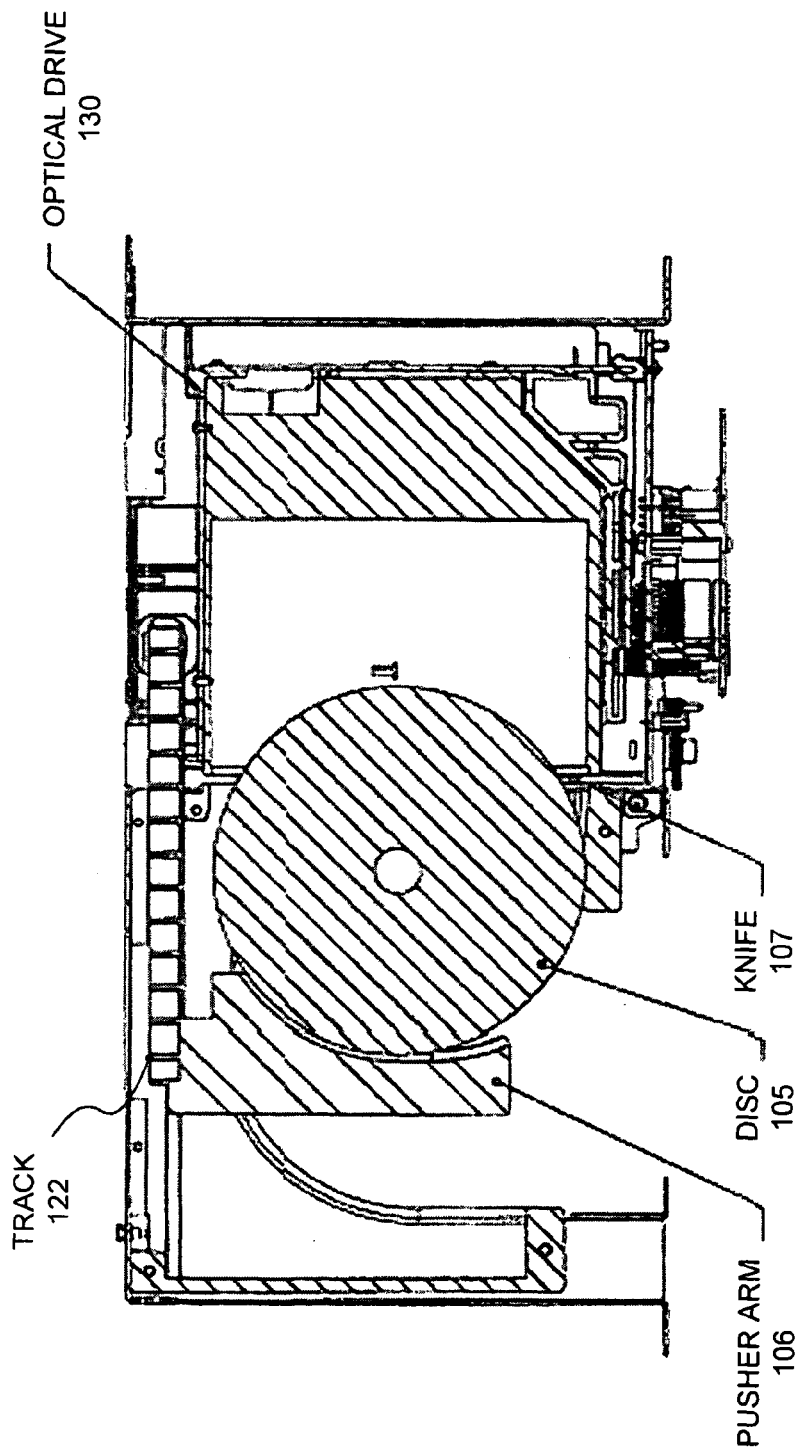
Figure 3C:
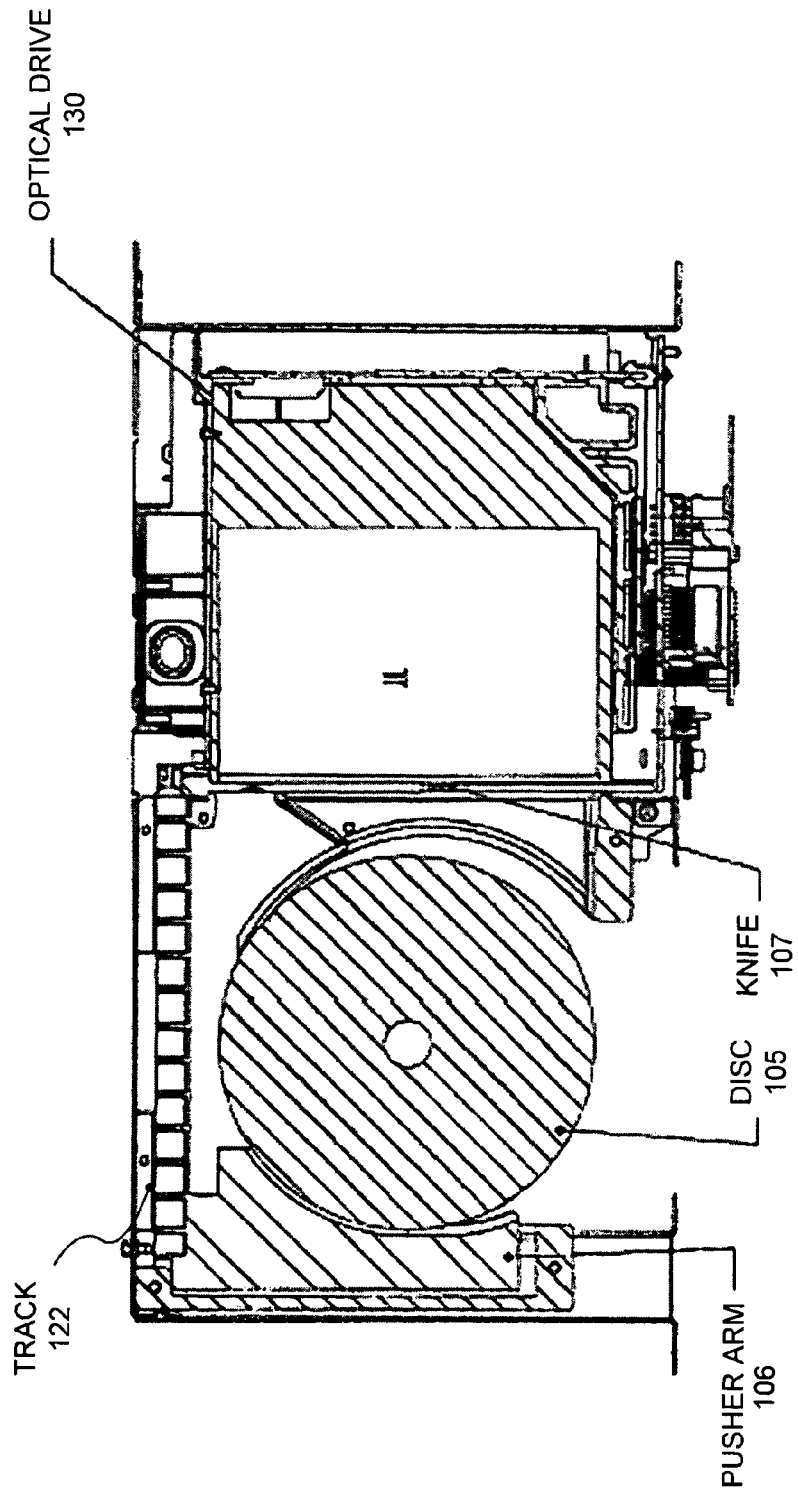

FIGS. 3A-C illustrate unloading a disc 105 from an optical drive 130 of a data storage appliance 100, in accordance with one embodiment. The carousel 104 rotates around the optical drives in FRUs 103A, 103B until the appropriate slot for storage of the disc 105 in the carousel 104 is aligned with the appropriate side 102A, 102B of the disc transfer assembly 101. FIG. 3A shows the initial position of the pusher arm 106, the disc 105, and the knife 107 relative to the optical drive. The pusher arm 106 is in the position furthest from the optical drive 130. In the example shown, the knife 107 moves to the lower, inactive position in preparation for the disc 105 unloading from the optical drive 130 and returns to the top, active position after the disc 105 has been ejected to ensure the disc 105 completes the move back to the carousel 104.

FIG. 3B illustrates the position of the pusher arm 106, the disc 105, and the knife 107 in the middle of the unloading operation. In this example, the pusher arm 106 moves laterally along track 122 into position to catch the disc 105 that is being ejected from the optical drive 130. In some embodiments, the disc transfer assembly 101 is funnel-shaped at the bottom, which allows for smooth disc handling. In this way, the optical disc 105 is controlled as it is expelled from the drive 130, which helps prevent the disc 105 from crashing into adjacent discs in the bowl 104 and from failing to be stored in the proper slot in the bowl 104.

FIG. 3C illustrates the position of the pusher arm 106, the disc 105, and the knife 107 at the conclusion of the unloading operation. The pusher arm 106 retracts along track 122 to the position furthest from the optical drive 130. At the same time, the knife 107 raises, which pushes the disc 105 away from the optical drive 130 and further into the bowl 104. At the conclusion of the unloading operation, the disc 105 is once again at rest in a slot in the bowl 104. The knife 107 remains in the raised position to prevent the undesired loading of a disc 105.

3. Field-Replaceable Units

FIGS. 4A-B are views of an example of a field-replaceable unit ("FRU") 103 for housing a standard optical slim drive 130, in accordance with one embodiment. FIG. 4A illustrates one side of the FRU housing 440, and FIG. 5B illustrates the opposite side. The proper functioning and reliability of the media library appliance 100 relies on the accurate alignment of the FRUs 130 with respect to the remainder of the appliance 100 when the FRU 103 is replaced by a customer in the field, from time to time. Thus, the FRU 103 comprises a molded frame with various features that allow accurate registration of the optical drive 130 within the appliance 100 upon replacement. In this example, the alignment grooves 441 and the alignment tabs 442 assist in properly registering the FRU registering plane 443 to a matching reference plane inside the appliance 100. In addition, spring tabs 445 shown on the reverse side of the FRU housing 440 in FIG. 4B are used to accurately position the FRU 103 in relation to a funnel of the carousel 104 of the appliance 100, which allows for smooth disc transfers into and out of the optical drive 130 within the FRU 103. These keying features ensure a 3-axis alignment that properly positions the FRU 103 inside the appliance 100.

FIG. 4A also illustrates an optical drive PCBA 444. In one embodiment, the optical drive printed circuit board assembly ("PCBA") 144 is positioned along the side of the drive 103 (oriented vertically) for easy access.

FIG. 4A-B also illustrates elements of the latch 108 of the FRU 103 in more detail. In one embodiment, the latch 108 comprises a latch release button window 448 and latch locking windows 449. The latch release button window 448 is an opening through which a user can reach to depress a latch button (shown in FIG. 6A-B) to release latch locking tabs (also shown in FIG. 6A-B). By releasing the latch locking tabs, the latch disengages from the latch locking windows 449 of the FRU 103. Thus, the FRU 103 can be lifted out of the appliance 100 using the handle 409.

FIGS. 5A-B are views of another example of a FRU 103, in accordance with one embodiment. FIG. 5A shows one side of the FRU housing 440, and FIG. 5B shows the other side. FIGS. 5A-B show one alternative for the placement of the various alignment features of the FRU 103, but many variations are also possible. Alternative designs may include more or fewer tabs, ribs, grooves, "snap-in" features, or any combination of these or other alignment features known to those of skill in the art for providing 3-axis alignment of the FRU 103. In the example illustrated in FIG. 5A-B, four alignment tabs with positive "snap-in" features 542 are placed on one side of the housing 440 along the registering plane 543 that mate with corresponding features in the appliance 110. On the other side of the housing 440, four spaced ribs 541 are used for alignment to ensure a snug fit between the appliance 110 and registering plane 543.

FIG. 5A-B also illustrates elements of an alternate latch 108 of a FRU 103 in more detail. In this embodiment, the latch 108 comprises a button-latch 508 which locks the FRU 103 into a corresponding slot in the sheet metal assembly the appliance 100. By pressing the button-latch, the lock in to the slot is released, and FRU 103 can be lifted out of the appliance 100 using the handle 509.

FIGS. 6A-B are views of an example of a FRU 103 of FIGS. 4A-B positioned for insertion in the appliance 100, in accordance with one embodiment. These views illustrate one example of the alignment of a groove 441 on a FRU 103 and the corresponding alignment pin 661 that fit together when the FRU 103 is inserted. Likewise, the alignment tabs 442 on the FRU 103 fit together with the corresponding alignment slots 662 in the hardware surrounding the FRU 103. As described above, many alternatives are also possible. As shown in FIG. 6A-B, the FRU 103 slides vertically into and out of the appliance 100.

When the FRU 103 is in the appliance 100, a latch release button 668 extends partially through the opening in the handle 409, thus forming a locking mechanism. In order to release the FRU 103 from the appliance 100, a person depresses the latch release button using one or more fingers extending through the opening in the handle 409. Then, the person can lift the FRU 103 out of appliance 100 with the same one or more fingers that depressed the latch release button 668.

These features of the invention allow for a single finger removal of the FRU 103 that has been latched into the appliance 100.

FIG. 7A illustrates the alignment of two FRUs 103A, 103B positioned for insertion in the appliance 100, in accordance with one embodiment. Note that in this embodiment, the FRUs 103A, 103B reside back to back within the appliance 100, as illustrated in FIG. 7B. This arrangement of optical drives has the benefit of keeping the footprint of the appliance 100 relatively small.

Also shown in FIG. 7A are various alignment features, including tabs, slots, and holes, on the appliance 100 that correspond to various alignment features present on the FRU 103A, 103B. First, lead-in chamfers 770 guide the insertion of the FRU 103A, 103B into the compartment within the appliance 100. The alignment tabs with positive "snap-in" features 542 on the FRU 103B, snap into the corresponding holes 772 on the appliance 100. The slots or holes 772 may have lead-in chamfers 771 for assisting with the engagement of the alignment tabs 542 to the corresponding holes 772. In addition, guiding tabs 774 assist in the removal of the FRU by pressing inward on the positive "snap-in" features 542 of the FRU 103A, 103B to assist the features 542 with exiting the corresponding holes 772 as the FRU is lifted upward. The button-latch 508 on the FRU 103A, 103B has a corresponding locking slot 778 on the appliance 100. The button-latch 08 protrudes through the slot to lock the FRU 103A, 103B in place. A divider 777A separate the two FRUs 103A, 103B. A lower ramp 777B of the divider 777A guides a FRU 103A, 103B into place by pushing the FRU 103A, 103B away from the divider 777A at the bottom of the registering plane 543. The alignment ribs 541 push the FRU 103A, 103B away from the divider 777A at the top of the registering plane 532.

Figure 8:
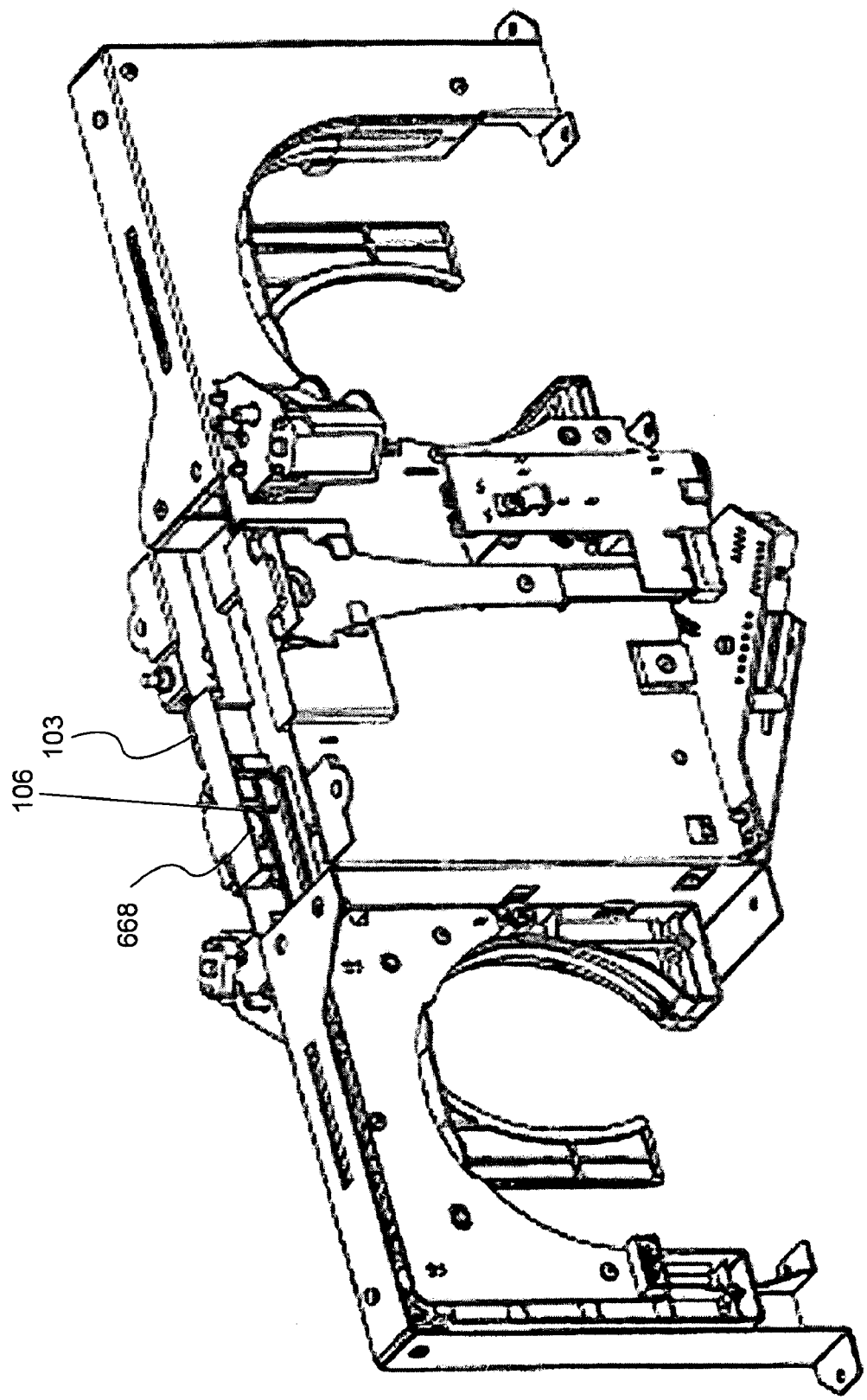
FIG. 8 illustrates an optional feature of the disc transfer assembly, in accordance with one embodiment of the invention.

FIG. 8 illustrates an optional feature of the disc transfer assembly 101, in accordance with one embodiment of the invention. In one embodiment, the pusher arm 106 corresponding to a functional FRU 103 can be positioned as shown in FIG. 8 to block access to the latch release button 668 to prevent accidental removal of a functional FRU 103. As an additional or alternative signal to the user, a green LED or other signaling mechanism associated with the functional FRU 103 may also be used to indicate which of the two optical drive FRUs is functioning properly. In contrast, the pusher arm 106 of the failed FRU 103 is not positioned to block access to the latch release button 668 for the FRU 103, and the failed FRU 103 may also be marked by a red LED or other signaling mechanism associated with the failed FRU 103. Thus, this optional feature provides a mechanism for preventing a user from accidentally replacing the wrong FRU 103.

The above description is included to illustrate the operation of the embodiments and is not meant to limit the scope of the invention. From the above discussion, many variations will be apparent to one skilled in the relevant art that would yet be encompassed by the spirit and scope of the invention. Those of skill in the art will also appreciate that the invention may be practiced in other embodiments. First, the particular naming of the components, capitalization of terms, the attributes, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A rack mountable media library appliance comprising:
   dual field-replaceable units, each field-replaceable unit housing a standard optical slim drive in a vertical orientation;
   a rotatable circular disc carousel for storing a plurality of optical discs, the rotatable disc carousel rotating around the dual field-replaceable units; and
   a disc transfer assembly comprising two sides, each side corresponding to a respective one of the drives, each side comprising a pusher arm to push on a trailing outer edge of a disc to transfer the disc at least partly into the respective drive.

2. The media library appliance of claim 1, wherein each of the dual field-replaceable units are replaceable without powering off the media library appliance.

3. The media library appliance of claim 1, wherein the pusher arm slides laterally on a track.

4. The media library appliance of claim 1, wherein the pusher arm only contacts the disc on the outer edge.

5. The media library appliance of claim 4, wherein the pusher arm has a curved contact surface corresponding to the outer edge of the disc.

6. The media library appliance of claim 1, wherein the media library appliance has a size of five rack mount units.

7. The media library appliance of claim 1, wherein each side of the disc transfer assembly further comprises a moveable knife, wherein the movement of the knife into an active position pushes a disc further into the respective drive during a disc loading operation.

8. The media library appliance of claim 7, wherein the moveable knife in the active position at least partially blocks an opening of the respective drive, thereby preventing unloading of a disc from the respective drive or preventing attempted loading of another disc when the respective drive is occupied.

9. The media library appliance of claim 7, wherein the movement of the knife into an active position during a disc unloading operation pushes a disc ejected from the respective drive away from the drive and into the carousel.

10. The media library appliance of claim 1, wherein a bottom of the disc transfer assembly is funnel-shaped to assist with smooth transfers of discs from a respective drive into the disc carousel.

11. The media library appliance of claim 1, wherein each of the dual field-replaceable units comprise alignment features for accurate three-axis alignment and registration of the optical slim drive within the appliance.

12. The media library appliance of claim 1, wherein each of the dual field-replaceable units slides vertically into and out of the appliance.

13. The media library appliance of claim 1, wherein each of the dual field-replaceable units are latched into the appliance.

14. The media library appliance of claim 13, wherein the pusher arm of the disc transfer assembly blocks access to a latch release button to prevent accidental replacement of a functional field-replaceable unit.

15. The media library appliance of claim 13, wherein a latch release button extends partially through an opening in a handle of a field-replaceable unit, and responsive to the latch release button being pushed with one or more fingers, the field-replaceable unit is unlatched and able to be lifted via the handle.

16. A media library appliance comprising:
    dual field-replaceable units, each field-replaceable unit housing a standard optical slim drive in a vertical orientation;
    a means for storing a plurality of optical discs, the means for storing a plurality of optical discs rotating around the dual field-replaceable units; and
    a disc transfer means comprising two sides, each side corresponding to a respective one of the drives, each side comprising a means to push on a trailing outer edge of a disc to transfer the disc at least partly into the respective drive.

17. The media library appliance of claim 16, wherein the disc transfer means further comprises a means for exerting a lateral force to push the disc further into the respective drive and partially block an opening to the respective drive to prevent unloading of a disc from the respective drive or to prevent attempted loading of another disc when the respective drive is occupied.

18. The media library appliance of claim 16, wherein a bottom of the disc transfer means is funnel-shaped to assist with smooth transfers of discs from a respective drive into the means for storing the plurality of optical discs.

* * * * *